(12) United States Patent
Lin

(10) Patent No.: US 6,622,216 B1
(45) Date of Patent: Sep. 16, 2003

(54) BUS SNOOPING FOR CACHE COHERENCY FOR A BUS WITHOUT BUILT-IN BUS SNOOPING CAPABILITIES

(75) Inventor: Shuaibin Lin, Broomfield, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/852,437

(22) Filed: May 10, 2001

(51) Int. Cl.$^7$ ............................................. G06F 12/00
(52) U.S. Cl. .................... 711/141; 711/146; 711/143
(58) Field of Search ................. 711/141, 146, 711/143

(56) References Cited

U.S. PATENT DOCUMENTS

| | | | | |
|---|---|---|---|---|
| 4,141,067 A | * | 2/1979 | McLagan | 711/146 |
| 5,119,485 A | * | 6/1992 | Ledbetter et al. | 711/146 |
| 5,504,874 A | * | 4/1996 | Galles et al. | 711/145 |
| 6,341,337 B1 | * | 1/2002 | Pong | 711/146 |

OTHER PUBLICATIONS

AMBA™ Specification (Rev. 2.0), Section 1.5, pp. 1–7 through 1–8, and Chapter 3, pp. 3–1 through 3–58, May 13, 1999.

* cited by examiner

*Primary Examiner*—Donald Sparks
*Assistant Examiner*—Paul Baker
(74) *Attorney, Agent, or Firm*—Lathrop & Gage, L.C.

(57) ABSTRACT

A computer system incorporates bus snooping with a bus that does not enable bus snooping, such as the Advanced High-Performance Bus (AHB), to maintain cache coherency between caching devices and shared memory. Bus snooping capabilities are enabled by a stand-alone bus snooping device connected to the bus and the caching device or by bus snooping functions incorporated into the caching device. The bus snooping device monitors communications on the bus and causes invalidation of cached information to maintain cache coherency before the communications complete.

21 Claims, 5 Drawing Sheets

BUS SNOOPING FOR CACHE COHERENCY FOR A BUS WITHOUT BUILT-IN BUS SNOOPING CAPABILITIES

FIELD OF THE INVENTION

This invention relates to computer systems. More particularly, the present invention relates to a new and improved bus snooping device and technique for maintaining coherency between a main memory and one or more cache memories in a computer system having a bus, such as an Advanced High-Performance Bus (AHB), that does not have built-in bus snooping capabilities.

BACKGROUND OF THE INVENTION

Computer systems typically incorporate information (e.g. data and/or command) "caching" features into some components, such as central processing units (CPU's). The components use a copy of the information maintained in a high-speed memory (cache memory) separate from a slower main memory of the computer system, in which the original, or "primary," copy of the information is kept. Some computer systems, particularly high-end computer systems, incorporate more than one CPU or other component that caches information, i.e. multiple "caching devices." In some of the computer systems that have multiple caching devices, it is sometimes possible for more than one of the caching devices to cache the same information. Therefore, it is important to ensure, after one caching device alters its copy of the information or the original copy in the main memory, that the other caching devices using the same information do not use the previous information, which has become old, or "stale." In other words, the computer system must maintain "coherency" between information stored in the main memory and copies of the information stored in one or more cache memories.

In order to prevent caching devices from using stale information and in order to maintain cache coherency, "bus snooping" features have been incorporated into bus systems through which the caching devices communicate. A protocol for the bus system includes signals which enable bus snooping. Bus snooping essentially monitors activity on the bus system that indicates a change to a copy of the information which has been cached, so that the other copies of the information can be updated or invalidated. The "monitoring" is commonly referred to as "snooping."

Figure 1:
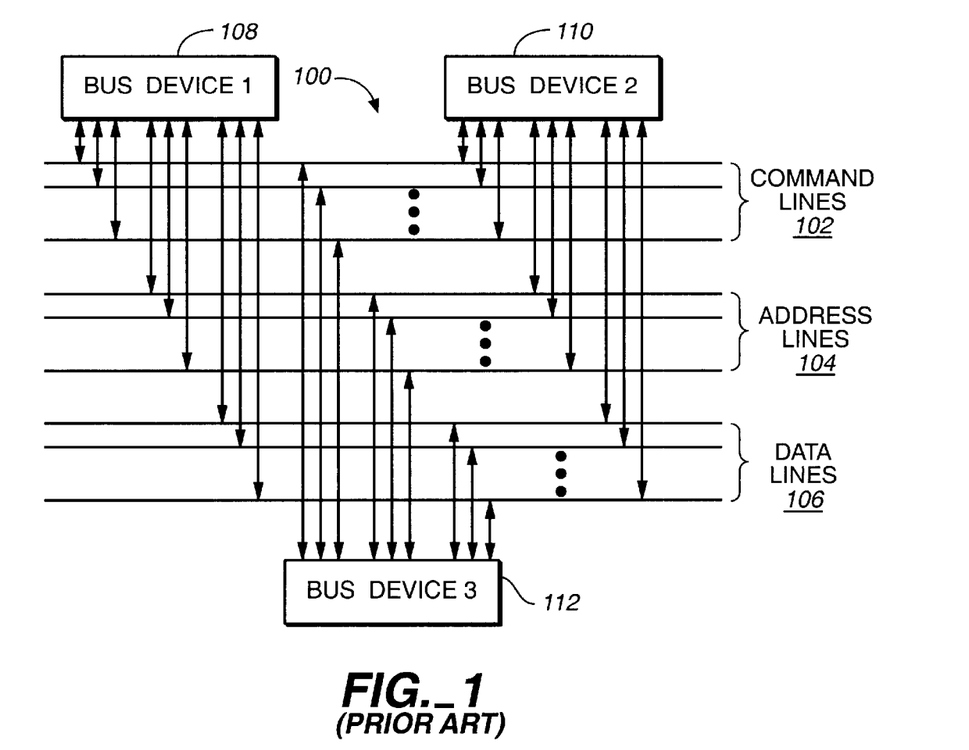
FIG. 1 is a block diagram of a prior art bus system with bus devices connected thereto.

A typical prior art bus system 100, which incorporates bus snooping features, as shown in FIG. 1, generally includes command lines 102, address lines 104 and data, lines 106 to which bus devices 108, 110 and 112 (e.g. bus controllers, bus masters, CPU's, etc.) are connected. Through the command lines 102, the bus system 100 transfers a "write" signal (not shown) that is asserted by the bus device (e.g. 108) that is attempting to write information (a "master" device, e.g. a CPU, direct memory access "DMA" device, etc.) to indicate to the bus device (e.g. 110) that is to receive the information (a "slave" device, e.g. the main memory, etc.) that a write request is being issued. The master bus device 108 places the address to which the information is to be written in the slave bus device 110 onto the address lines 104.

The caching devices (e.g. bus device 112) that are not involved in the write request monitor the write signal (not shown) on the command lines 102. When the write signal is asserted, the caching bus device 112 reads the address lines 104 and compares the address to the addresses of the information that the caching bus device 112 has cached. Upon a match, the caching bus device 112 invalidates the cached information, so the caching bus device 112 will have to read the new information from the slave bus device 110 when the caching bus device 112 next accesses the information.

Through the command lines 102 the bus system 100 transfers a "hold" signal (not shown) for preventing the master bus device 108 from performing the write command until after the other caching devices (caching bus device 112) have completed the write-signal-snooping and address-comparing functions. After the caching bus device 112 completes the snooping and comparing functions, the caching bus device 112 releases, or deasserts, the hold signal, so the master and slave bus devices 108 and 110 can continue with the write command.

Among bus systems that do not have bus snooping capabilities is the Advanced High-Performance Bus (AHB) (TM) from ARM Limited. The AHB is described in the AMBA (Advanced Microcontroller Bus Architecture) (TM) Specification (Rev 2.0) from ARM Limited. The disclosure of this specification is incorporated herein by this reference. Generally, the AHB is a high-performance "system bus," as distinguished from a "peripheral bus" (e.g. Peripheral Component Interconnect "PCI," Industry Standard Architecture "ISA," etc.), on which the CPU, a Direct Memory Access (DMA), a Digital Signal Processor (DSP), an external memory interface, a peripheral bus bridge and/or an internal memory, among other devices designed to the AMBA Specification (Rev. 2.0), are connected for fast access.

Figure 2:
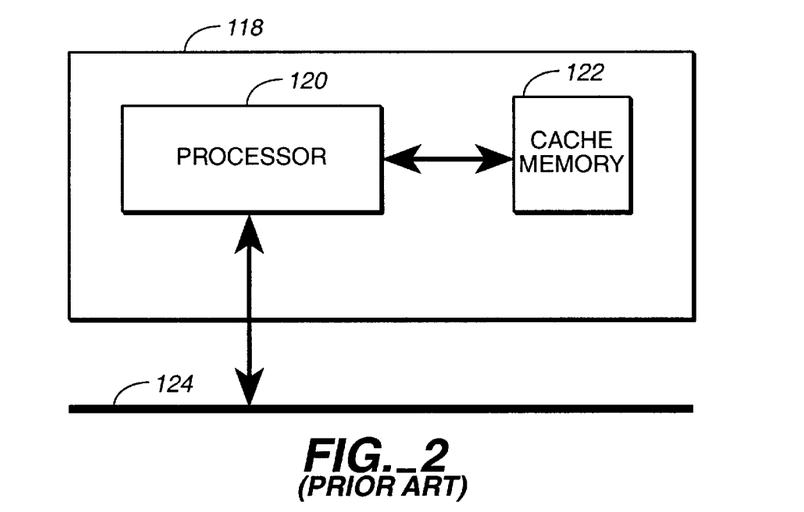
FIG. 2 is a block diagram of a prior art master device connected to the prior art bus system shown in FIG. 1.

The AMBA Specification (Rev. 2.0) does not include bus snooping capabilities and the AHB protocol described therein does not include signals to maintain cache coherency between devices connected to the AHB. Information cannot be stored in cache memory and shared between caching devices in a computer system having the AHB because the computer system may not operate in a consistent or predictable manner since cache coherency cannot be maintained in the computer system. Therefore, since the AHB does not support bus snooping, only one caching device, such as a master device 118 as shown in FIG. 2 having a processor 120 and a cache memory 122, may be connected to the AHB 124. Otherwise, if there is more than one caching device, each caching device must not be allowed to cache the same information. With only one caching device (master device 118), however, it is not possible for two devices on the AHB 124 to have duplicate copies of information that both can use and/or alter, so there is no risk of a device using stale information. Likewise, there is no signal that is equivalent to the hold signal (not shown, but described above with reference to FIG. 1) transferred through the command lines 102 (FIG. 1) that can delay a write request issued by the master device 118 onto the AHB 124 for the purpose of enabling bus snooping.

Figure 3:
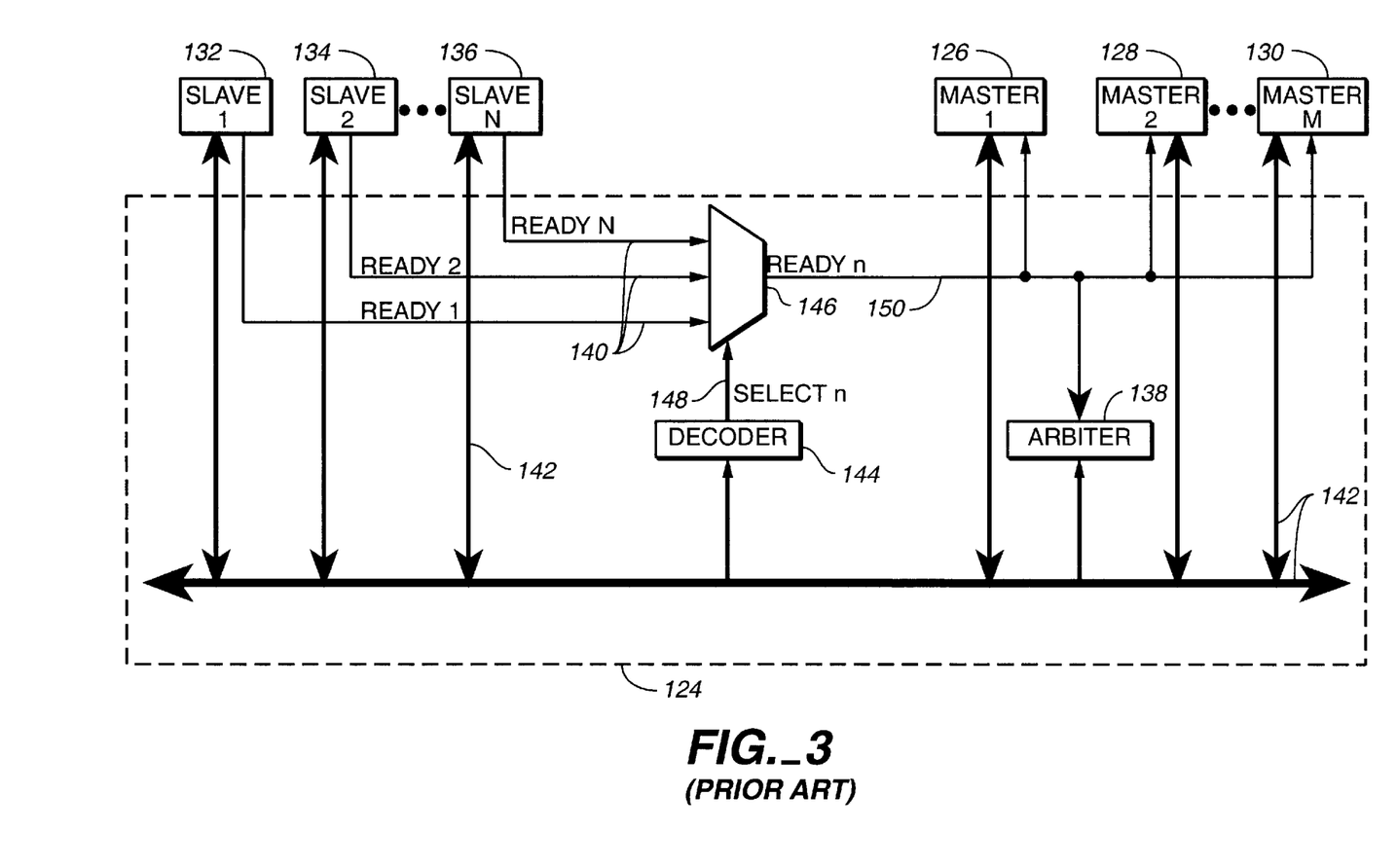
FIG. 3 is a block diagram of another prior art bus system with master and slave devices connected thereto.

Without the equivalent of a hold signal (not shown) transferred through the command lines 102 (FIG. 1) to enable snooping of write requests, the procedure for a master device 126,128 or 130, as shown in FIG. 3, to establish a connection with a slave device 132,134 or 136 through the AHB 124 is briefly described here. One of the master devices (e.g. 130) requests control of the AHB 124 in order to access one of the slave devices (e.g. 136). An arbiter 138 determines whether to grant the access. Upon grant, the requesting master device 130 and the slave devices 132–136 assert, or exchange, a series of signals according to the AMBA Specification (Rev. 2.0) to establish the connection between the requesting master device 130 and the requested slave device 136. The connection is generally established upon selection of an asserted "ready" signal 140 (among other command, address and data lines 142 of the AHB 124) from the requested slave device 136 by a decoder 144. The decoder 144 selects the asserted ready signal 140 of the requested slave device 136 by decoding an address of the requested slave device 136 (supplied by the requesting master device 130 on the other command/address/data lines 142) into a "select" signal 148, which causes a multiplexor 146 to pass the asserted ready signal 140 of the requested slave device 136 as a selected ready signal 150 to the master devices 126–130 and the arbiter 138. Only the requesting master device 130 responds to the selected ready signal 150.

It is with respect to these and other background considerations that the present invention has evolved.

SUMMARY OF THE INVENTION

One aspect of the present invention relates to maintaining cache coherency in a computer system that has a bus system that does not support bus snooping, such as AHB (Advanced High-Performance Bus). The invention also relates to including bus snooping in a computer system having a bus system that does not have a bus signal that enables bus snooping. The invention also relates to a stand-alone bus snooping device, separate from the bus system and the devices that include caching capabilities (caching devices).

Generally, a new and improved bus snooping device monitors, or "snoops," information transfer activity on the bus system on behalf of one or more caching devices to determine when cached information is about to be changed in a "slave" device, such as a main computer memory or other receiving device, so that the cached copy of the information must be invalidated. The protocol under which the bus system operates preferably includes a "ready" signal which the slave device asserts to signal a "master" device, such as a CPU (central processing unit), DMA (direct memory access) or other sending device, that it is ready to receive the information transfer. The bus snooping device intercepts, disables or delays the ready signal until it can determine whether the cached information must be invalidated in the caching device. In this manner, the bus snooping device enables bus snooping capabilities for a bus system that does not include built-in support for bus snooping.

The bus system is preferably a "system bus," such as the AHB, instead of a peripheral bus, since the CPU(s), any other caching devices and other master and/or slave devices typically connect to the system bus of a computer. System. buses, however, are typically proprietary, instead of industry standards, or widely accepted de facto standards, such as PCI (Peripheral Component Interconnect) and ISA (Industry Standard Architecture) are for peripheral buses. The AHB, for example, is a proprietary system bus that has been incorporated into computer systems by several computer makers. The AHB supports multiple CPU's, but does not allow the CPU's to share memory space since it does not support bus snooping. Therefore, without changing any aspect of the AHB, the present invention enables bus snooping and the incorporation of multiple memory-sharing CPU's in a computer system having an AHB.

A more complete appreciation of the present invention and its improvements can be obtained by reference to the accompanying drawings, which are briefly summarized below, by reference to the following detailed description of a presently preferred embodiment of the invention, and by reference to the appended claims.

DETAILED DESCRIPTION

Figure 4:
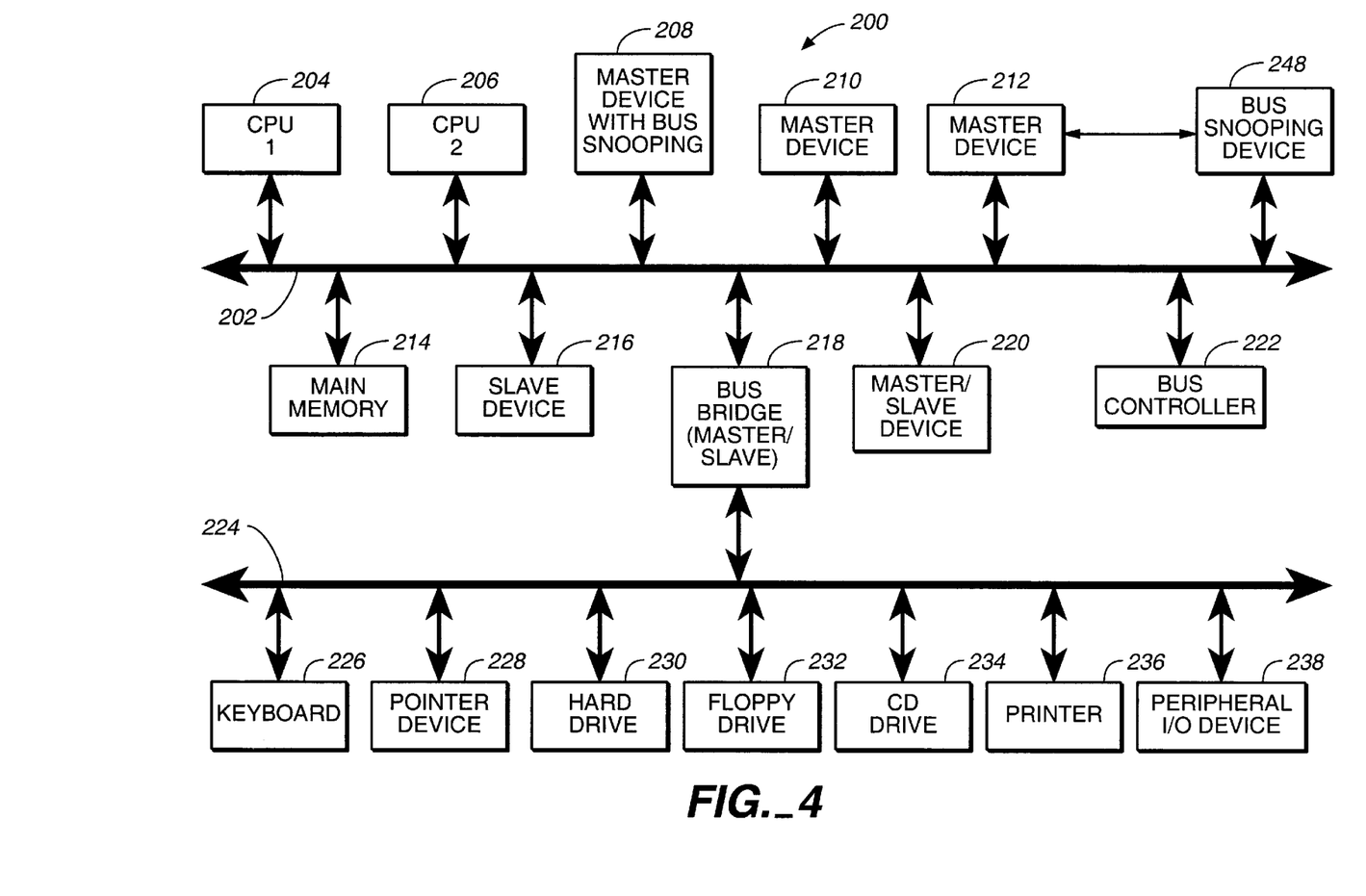
FIG. 4 is a block diagram of a computer system incorporating the present invention.

The bus snooping capabilities of the present invention are preferably incorporated into a computer system, such as the exemplary computer system 200 shown in FIG. 4. The computer system 200 includes a conventional system bus 202, such as an Advanced High-Performance Bus (AHB), that does not have bus snooping capabilities. Several bus devices 204–220 are connected to the system bus 202 to initiate and respond to information transfer activity across the system bus 202. Additionally, a conventional bus controller 222 is connected to the system bus 202 to control operation thereof.

The bus devices 204–222 typically include master devices 204, 206, 208, 210 and 212 that request access to other bus devices through the system bus 202, slave devices 214 and 216 that respond to the access requests from the master devices and master/slave devices 218 and 220 that function as either master devices or slave devices depending on the circumstances. The master devices 204–212 typically include one or more conventional central processing units (CPU's) 204 and 206, master device(s) 208 having bus snooping capabilities and other conventional master devices 210 and 212. The slave devices 214 and 216 typically include a conventional main computer memory 214 and other conventional slave device(s) 216. The master/slave devices typically include conventional bus bridge(s) 218 and other conventional master/slave device(s) 220. The bus bridge 218 preferably connects between the system bus 202 and a peripheral bus 224 to which various conventional peripheral devices are connected, such as a keyboard 226, a pointer device 228, a hard drive 230, a floppy drive 232, a compact disk (CD) drive 234, a printer 236 and other conventional peripheral I/O (input/output) devices 238.

Some of the bus devices include information caching capabilities (caching devices, e.g. 204, 206, 208 and 212). These caching devices 204, 206 208 and 212 cache information for which the primary storage location is in the main memory 214 or other slave device 216. To maintain the coherency of the information between the caching devices 204, 206, 208 and 212 and the main memory 214 or other slave device 216, bus snooping capabilities, as described below, are included in or supplied for the caching devices 204, 206, 208 and 212.

Figure 5:
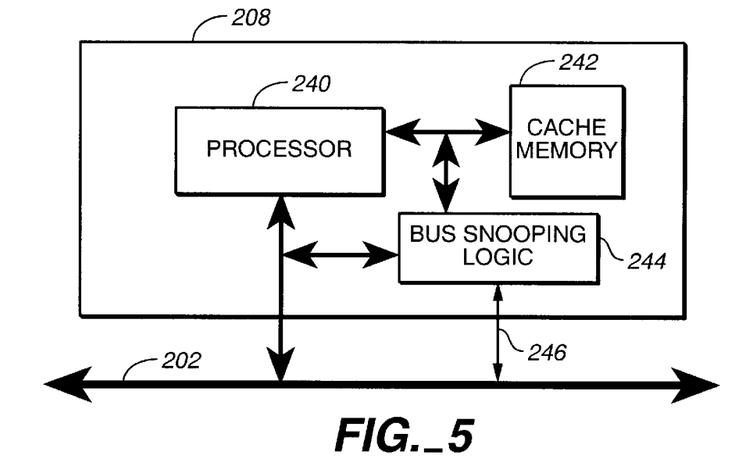
FIG. 5 is a block diagram of a bus snooping master device incorporated in the computer system shown in FIG. 4.

The master device 208, for example, includes built-in new and improved bus snooping capabilities, as shown in FIG. 5. The master device 208 preferably includes a conventional processor 240 connected to a conventional cache memory 242 and to the system bus 202. The master device 208 also includes bus snooping logic 244 connected to the cache memory 242 and to the system bus 202 to perform the bus snooping functions and to supply an information transfer enable signal 246 to the system bus 202. The information transfer enable signal 246 enables and disables the information transfer activity on the system bus 202 while the bus snooping logic 244 performs the bus snooping functions.

Figure 6:
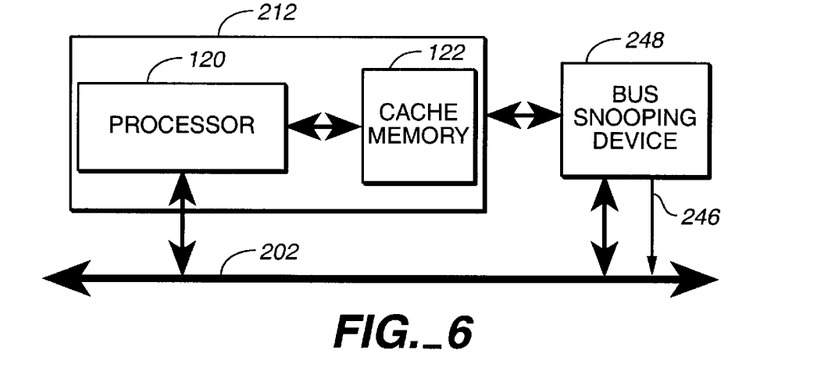
FIG. 6 is a block diagram of a bus master device and external bus snooping device incorporated in the computer system shown in FIG. 4.

The master device 212, on the other hand, is similar to the master device 118 (FIG. 2), as shown in FIG. 6, so it has bus snooping capabilities provided for it by a connected external stand-alone bus snooping device 248 (see also FIG. 4). The bus snooping device 248 connects to the master device 212 and to the system bus 202 to perform the bus snooping functions for the master device 212 and to supply the information transfer enable signal 246 to the system bus 202.

The CPU's 204 and 206 (FIG. 4) operate according to either example (master device 208 or 212). Therefore, the below discussion of bus snooping will be made primarily with reference to the master devices 208 and 212.

Figure 7:
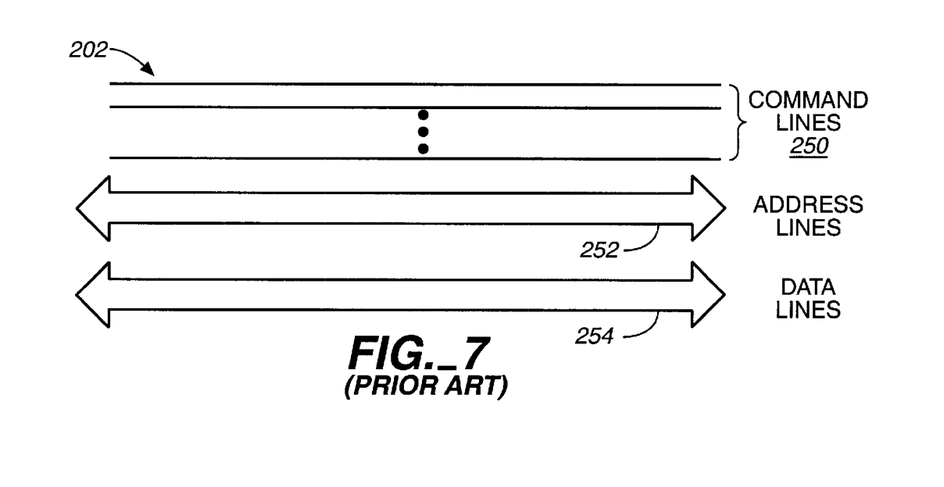
FIG. 7 is a block diagram of a prior art bus system incorporated in the computer system shown in FIG. 4.

The system bus 202, as shown in FIG. 7, includes command lines 250, address lines 252 and data lines 254. The master devices 204–212 and 218 (FIG. 4) transfer a write signal (not shown) on the command lines 250 to initiate information transfer activity (e.g. data read and write requests) on the system bus 202. The slave devices 214, 216 and 218 (FIG. 4) transfer a ready signal (not shown) on the command lines 250 to indicate that they are ready to respond to the information transfer activity. Typically, one of the master devices (e.g. 210) acquires control of the system bus 202 (e.g. by conventional bus arbitration procedures) and asserts the write signal to indicate that the master device 210 is initiating a data write request to one of the slave devices (e.g. 216). The master device 210 also indicates, via the command lines 250 and address lines 252, the desired slave device 216 to which the data write request is directed and the location within the slave device 216 at which data is to be written. Each slave device 214, 216 and 218 attempts to assert the ready signal in response to the write signal when it is ready to receive the data, but the system bus 202 selects the ready signal of only the desired slave device 216 to pass to the master devices 204–212 and 218. Additionally, only the initiating master device 210 responds to the ready signal to proceed with the data write request.

The bus snooping device 248 (FIGS. 4 and 6) (or the bus snooping logic 244, FIG. 5) uses conventional logic to monitor, or "snoop," the write signal transferred on the control lines 250 to detect when information is to be changed within any of the slave devices 214 and 216 (FIG. 4). The information, for which the primary storage is the slave devices 214 and 216, may also have been cached within the master device 208 (FIGS. 4 and 5) (or master device 212, FIGS. 4 and 6). Therefore, if the information is to be changed in the slave device 214 or 216, then the cached copy in the cache memory 242 (FIG. 5) (or cache memory 122, FIG. 6) will have to be invalidated (or replaced). To enable determining whether the information has been cached, the bus snooping device 248 also monitors the command lines 250 and the address lines 252, so that, upon detecting the transfer of the write signal on the control lines 250, the bus snooping device 248 determines which slave device 214 or 216 is the receiving slave device 214 or 216 and the location therein where the information is to be written. The bus snooping device 248 then performs a conventional cache tag lookup procedure to determine whether the information has been cached. If so, then the bus snooping device 248 causes the information to be invalidated. While the bus snooping device 248 is performing the detection, lookup and invalidation procedures, it uses conventional logic to intercept, disable or delay the ready signal (not shown) on the control lines 250 with the information transfer enable signal 246 (FIG. 5 or 6) on the system bus 202, as described below.

Figure 8:
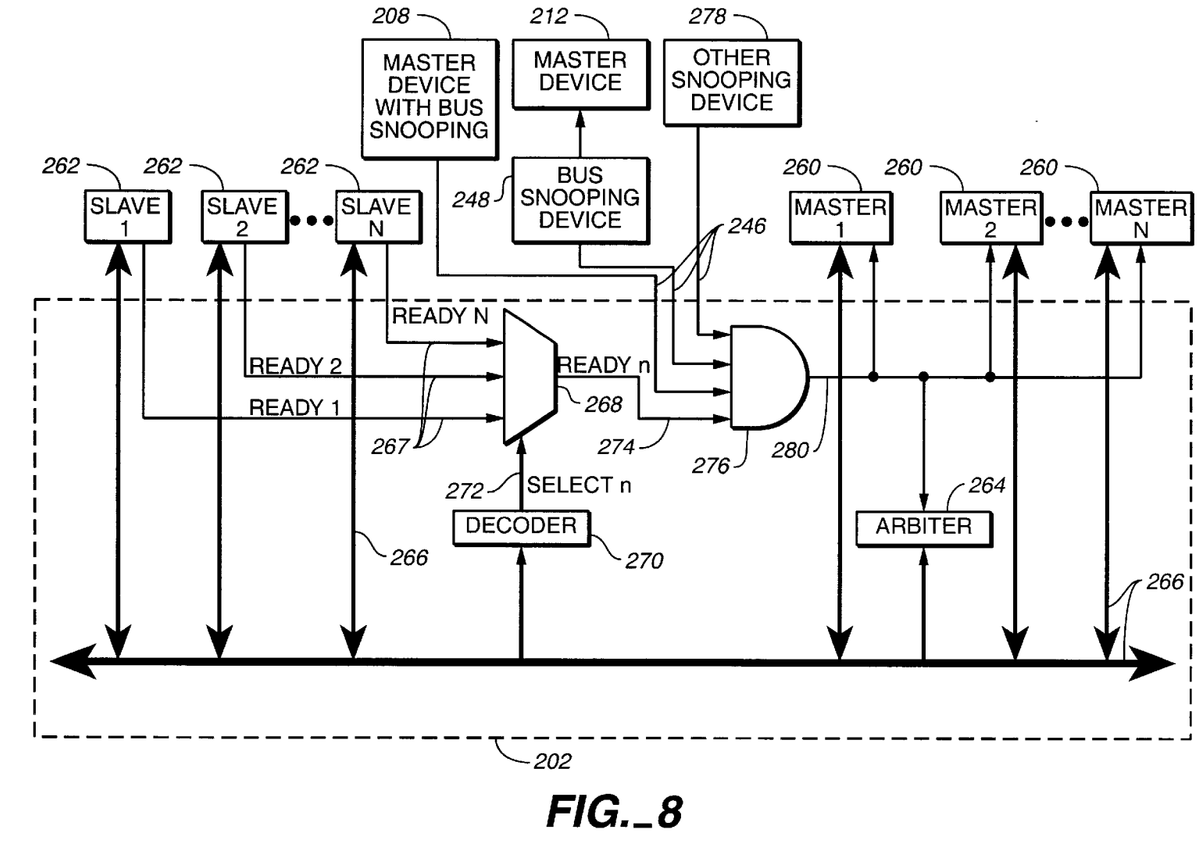
FIG. 8 is a block diagram of a bus system with master, slave and bus snooping devices connected thereto in the computer system shown in FIG. 4.

FIG. 8 shows how the bus snooping device 248 (see also FIGS. 4 and 6) and the bus snooping logic 244 (FIG. 5) intercept, disable or delay the information write activity on the system bus 202 (see also FIGS. 4–7) with the information transfer enable signal 246 (see also FIG. 5 or 6). Similar to the prior art shown in FIG. 3, a master device 260 that requires access to one of the slave devices 262, such as for a data write function, requests control of the system bus 202. An arbiter 264 determines when to grant the control. Upon grant of the control of the system bus 202, the requesting master device 260 transfers the write signal (not shown) on the control lines 250 (FIG. 7), which each slave device 262 receives. The requesting master device 260 also places an identifier for the desired slave device 262 and an address for a location within the desired slave device 262 onto other command/address/data lines 266 of the system bus 202, including the command and address lines 250 and 252 (FIG. 7).

In response to the write signal (not shown) transferred on the control lines 250 (FIG. 7), and when ready to receive the data, each slave device 262 supplies a ready signal 267 on the control lines 250 of the system bus 202 at a multiplexor 268. A decoder 270 receives the identifier for the desired slave device 262 through the other command/address/data lines 270 and decodes the identifier into a "select" signal 272. The select signal 272 is also supplied to the multiplexor 268. With the select signal 272, the multiplexor 268 selects the ready signal 267 from the desired slave device 262 and supplies this ready signal 267 as a selected ready signal 274.

The selected ready signal 274 is not supplied directly to the master devices 260. Instead, it is supplied as an input to an AND gate 276, the other inputs of which are the information transfer enable signals 246 supplied by the bus snooping device 248 connected to the master device 212, the bus snooping logic 244 (FIG. 5) of the master device 208 and any other bus snooping devices or master devices with bus snooping capabilities 278 connected to the system bus 202. Not until all of the bus snooping devices 248 and master devices with bus snooping capabilities 208 have completed their bus snooping functions and asserted their information transfer enable signals 246 will the AND gate 276 pass the selected ready signal 274 as a modified selected ready signal 280 to the master devices 260. Only the requesting master device 260 will respond to the modified selected ready signal 280 and proceed with the data write function. In this manner, bus snooping capabilities are enabled for the system bus 202, or any bus that does not have built-in support for bus snooping.

The computer system 200 (FIG. 4) has the advantage of being able to use a standard, or readily available, system bus 202, such as the AHB, that does not have bus snooping capabilities with more than one caching device that caches the same information. The invention maintains cache coherency by adding bus snooping capabilities to the computer system without changing the system bus. Another advantage of the present invention involves a stand-alone bus snooping device that can be used in conjunction with a bus that does not enable bus snooping, so that cache coherency can be maintained between multiple caching devices. Thus, the invention enables the main computer memory of the computer system to be shared between multiple caching devices.

Many other advantages and improvements will be apparent after gaining an understanding of the present invention.

The presently preferred embodiments of the present invention have been shown and described with a degree of particularity. These descriptions are of preferred examples of the invention. In distinction to its preferred examples, it should be understood that the scope of the present invention is defined by the scope of the following claims, which should not necessarily be limited to the detailed description of the preferred embodiments set forth above.

The invention claimed is:

1. A computer system comprising:

a receiving device containing primary information for use by the computer system and asserting a signal indicating that the receiving device is ready to receive new information;

a bus connected to the receiving device and having data, address and control signals exclusive of a signal related to bus snooping and inclusive of the signal asserted by the receiving device indicating that the receiving device is ready to receive the new information;

a caching device connected to the bus and containing cached information that includes a copy of the primary information;

a sending device connected to the bus to establish information transfer activity on the bus and to send the new information through the bus to the receiving device in response to assertion of the ready indicating signal by the receiving device, the new information replacing the primary information in the receiving device; and a bus snooping device connected to the bus to disable and enable the ready indicating signal, to monitor the signals on the bus to detect whether the information transfer activity changes the primary information and connected to the caching device to cause invalidation of the cached information in the caching device upon detecting that the information transfer activity changes the primary information, the bus snooping device delaying the information transfer activity by temporarily disabling the ready indicating signal until after detecting whether the information transfer activity changes the primary information, wherein said receiving device acts as a slave device on said bus and wherein said sending device acts as a master device on said bus.

2. A computer system as defined in claim 1 wherein:

the data, address and control signals of the bus include a signal enabling writing new information to the receiving device;

the sending device establishes the information transfer activity on the bus by asserting the write enabling signal on the bus;

the bus snooping device monitors the signals on the bus to receive the write enabling signal and to determine whether the new information replaces the primary information in the receiving device;

the bus snooping device detects that the information transfer activity changes the primary information by determining that the new information replaces the primary information; and the bus snooping device disables the ready indicating signal while receiving the write enabling signal and determining whether the new information replaces the primary information.

3. A computer system as defined in claim 2 further comprising:

a plurality of master devices, including the caching device and the sending device, that initiate the information transfer activity on the bus; and a plurality of slave devices, including the receiving device, that respond to the information transfer activity on the bus;

wherein the bus includes a system bus connected to the master devices and the slave devices.

4. A computer system as defined in claim 3 wherein:

each slave device is operative to assert the ready indicating signal when the slave device is ready to respond to the write enabling signal; and only one of the ready indicating signals asserted by the slave devices is selected to be supplied to the master devices and temporarily disabled by the bus snooping device to delay the information transfer activity.

5. A computer system as defined in claim 3 wherein the system bus includes an Advanced High-Performance Bus (AHB).

6. A computer system as defined in claim 2 wherein the caching device includes a processor, a cache memory and the bus snooping device.

7. A computer system as defined in claim 2 wherein:

cache coherency within the computer system is maintained by invalidating the cached information in the caching device when the primary information stored in the receiving device is being altered.

8. A method of maintaining cache coherency in a computer system having a bus that does not include bus snooping capabilities, the computer system including a sending device connected to the bus for sending information, a receiving device connected to the bus for storing the information, a caching device connected to the bus for caching the information and a bus snooping device connected to the bus and the caching device, the sending device initiates transfer activity on the bus, the receiving device sends a ready signal through the bus when the receiving device is ready for the transfer activity, comprising the steps of:

transferring the information through the bus to the receiving device wherein the receiving device acts as a slave device on said bus and wherein said sending device acts as a master device on said bus;

caching the information in the caching device;

initiating transfer activity on the bus that changes the information in the receiving device;

monitoring for the transfer activity on the bus at the bus snooping device;

sending the ready signal from the receiving device to the sending device through the bus in response to initiating the transfer activity;

detecting the transfer activity at the bus snooping device;

delaying the ready signal from reaching the sending device while responding to detecting the transfer activity;

determining whether the detected transfer activity changes the information in the receiving device;

invalidating the information in the caching device upon determining that the detected transfer activity changes the information in the receiving device; and stopping delaying the ready signal from reaching the sending device.

9. A method as defined in claim 8 comprising the further step of:

changing the information in the receiving device by completing the transfer activity after invalidating the information in the caching device.

10. A method as defined in claim 8 comprising the further steps of:

asserting a write signal on the bus as part of the initiating of the transfer activity;

receiving the write signal at the bus snooping device as part of the detecting of the transfer activity; and disabling the ready signal upon receiving the write signal at the bus snooping device to delay the ready signal from reaching the sending device.

11. A method as defined in claim 8 comprising the further steps of:

including a plurality of master devices, including the sending device and the caching device, in the computer system connected to the bus to initiate the transfer activity on the bus;

including a plurality of slave devices, including the receiving device, in the computer system connected to the bus to respond to the transfer activity on the bus.

12. A method as defined in claim 11 comprising the further steps of:

each slave device, including the receiving device, asserting the ready signal on the bus in response to initiating the transfer activity;

the bus selecting the ready signal from the receiving device for sending to the sending device;

the bus snooping device delaying the selected ready signal from reaching the sending device.

13. A method as defined in claim 11 wherein said bus is an Advanced High-Performance Bus.

14. A method as defined in claim 8 comprising the further step of:

including a processor I a cache memory and the bus snooping device within the caching device.

15. A bus snooping system connected to a data bus for maintaining information coherency between caching devices also connected to the data bus, comprising:

a bus snooping logic element coupled to the data bus for determining whether information associated with a particular caching device is consistent with information communicated on the data bus, wherein the bus snooping logic is adapted to generate a delay signal to prevent other devices from receiving the information communicated on the data bus until the data bus snooping logic finishes the determination of consistency;

a multiplexer coupled to receive ready signals from the other devices and coupled for selecting which of the other devices receives the communicated information; and a logic gate coupled to receive the delay signal from the bus snooping logic element and coupled to receive from the multiplexer a ready signal of one or more of the other devices, wherein the logic gate is adapted to delay the ready signal based on the delay signal.

16. The bus snooping system of claim 15, wherein the bus snooping logic element is integrated with the particular caching device.

17. The bus snooping system of claim 15, wherein the bus snooping logic element is externally coupled to the particular caching device.

18. The bus snooping system of claim 15, further comprising a decoder coupled to receive an identifier from a device providing the information communicated and coupled to provide a select signal to the multiplexer, wherein the multiplexer is adapted to receive the select signal to determine which of the other devices is to be selected.

19. The bus snooping system of claim 15, wherein the logic gate is a logical AND gate having an output coupled to provide the ready signal to a device providing the information communicated upon a release of the delay signal by the bus snooping logic element.

20. The bus snooping system of claim 15, wherein the particular caching device comprises a cache memory and wherein the bus snooping logic element is adapted to invalidate the information of the particular caching device when the information of the particular caching device is inconsistent with the information communicated on the data bus.

21. The bus snooping system of claim 15, wherein the bus snooping element is adapted to make the determination of consistency by performing a cache lookup.

* * * * *